United States Patent [19]

Kang

[11] Patent Number: 5,422,734
[45] Date of Patent: Jun. 6, 1995

[54] METHOD FOR ARITHMETICALLY ENCODING HALF-TONE IMAGE IN IMAGE PROCESSING SYSTEM

[75] Inventor: Ku-Soo Kang, Seoul, Rep. of Korea

[73] Assignee: SamSung Electronics Co., Ltd., Suwon, Rep. of Korea

[21] Appl. No.: 68,677

[22] Filed: May 28, 1993

[30] Foreign Application Priority Data

May 28, 1992 [KR] Rep. of Korea ............... 9205/1992

[51] Int. Cl.⁶ .............................................. H04N 1/41
[52] U.S. Cl. ................................... 358/429; 358/426; 358/261.2; 358/429; 358/430; 382/232
[58] Field of Search .................... 358/426, 429, 261.2, 358/430; 382/56

[56] References Cited

U.S. PATENT DOCUMENTS

| | | | |
|---|---|---|---|
| 4,266,249 | 5/1981 | Chai et al. | 358/429 |
| 4,766,499 | 8/1988 | Inozuka | 358/426 |
| 4,901,363 | 2/1990 | Toyokawa | 382/56 |

Primary Examiner—Scott A. Rogers
Assistant Examiner—Thomas L. Stoll
Attorney, Agent, or Firm—Robert E. Bushnell

[57] ABSTRACT

An arithmetic coding method for encoding each pixel of image containing half-tones in an image processing system is provided. This method includes the steps of: initializing an encoder before encoding each line; reading a pixel of a dithered image signal; determining reference pixels being an immediately preceding pixel, and a preceding pixel by a horizontal size of a dithering matrix for the read pixel; selecting a corresponding context number according to the values of the two reference pixels and a remainder obtained by dividing a horizontal position of the read pixel by the horizontal size of the dithering matrix; identifying context information corresponding to the context number, the context information including a more probable symbol and a probability therefor; encoding the more probable symbol if it matches the read pixel value, and encoding a less probable symbol otherwise; and updating a probability estimation of the context information.

20 Claims, 4 Drawing Sheets

{ # : A PIXEL TO BE CORRECTLY ENCODED
  X : REFERENCE PIXEL

FIG. 4

| CONTEXT NO. | I(i-4,j) | I(i-1,j) |
|---|---|---|
| 0 | 0 | 0 |
| 1 | 0 | 1 |
| 2 | 1 | 0 |
| 3 | 1 | 1 |

FIG. 5

| A | B | C | D | A | B | C | D | A | B | C | D | A | B | C | D | ... |
|---|---|---|---|---|---|---|---|---|---|---|---|---|---|---|---|---|
| 0 | 1 | 2 | 3 | 4 | 5 | 6 | 7 | 8 | 9 | 10 | 11 | 12 | 13 | 14 | 15 | ← HORIZONTAL POSITION OF PIXEL |
| 0 | 1 | 2 | 3 | 0 | 1 | 2 | 3 | 0 | 1 | 2 | 3 | 0 | 1 | 2 | 3 | ← REMAINDER OF HORIZONTAL POSITION OF THE PIXEL DIVIDED BY 4 |

FIG. 6

| | 0 | 1 | 2 | 3 | 4 | 5 | 6 | 7 | 8 | 9 | 10 | 11 th PIXEL |
|---|---|---|---|---|---|---|---|---|---|---|---|---|
| FIRST LINE | (1) 0 | (2) 1 | (3) 1 | (4) 0 | (5) 0 | (6) 1 | (7) 0 | (8) 1 | (9) 0 | (10) 0 | (11) 0 | (12) 1 |
| SECOND LINE | (13) 1 | (14) 0 | (15) 0 | (16) 1 | (17) 0 | (18) 0 | (19) 1 | (20) 0 | (21) 0 | (22) 1 | (23) 0 | (24) 0 |

| CONTEXT NO. | REMAINDER OF HORIZONTAL POSITION OF THE PIXEL DIVIDED BY 4 | $I(i-4,j)$ | $I(i-1,j)$ |
|---|---|---|---|
| 0 | 0 | 0 | 0 |
| 1 | 0 | 0 | 1 |
| 2 | 0 | 1 | 0 |
| 3 | 0 | 1 | 1 |
| 4 | 1 | 0 | 0 |
| 5 | 1 | 0 | 1 |
| 6 | 1 | 1 | 0 |
| 7 | 1 | 1 | 1 |
| 8 | 0 | 0 | 0 |
| 9 | 0 | 0 | 1 |
| 10 | 0 | 1 | 0 |
| 11 | 0 | 1 | 1 |
| 12 | 1 | 0 | 0 |
| 13 | 1 | 0 | 1 |
| 14 | 1 | 1 | 0 |
| 15 | 1 | 1 | 1 |

*FIG. 7*

METHOD FOR ARITHMETICALLY ENCODING HALF-TONE IMAGE IN IMAGE PROCESSING SYSTEM

FIELD OF THE INVENTION

The present invention relates to a method and device for arithmetically encoding an image containing half-tones and, more particularly, to a one-dimensional arithmetic coding method and device in a facsimile machine.

BACKGROUND OF THE INVENTION

Images containing half-tones can be binarized using dither matrices. A dither matrix is a two-dimensional matrix of thresholds. The images are binarized by comparing each successive pixel of a generated image signal to a corresponding threshold of the dither matrix and generating a binary signal, a dithered signal, in dependence upon whether the pixel value of the image signal is greater or smaller than the corresponding threshold in the dither matrix. Therefore, only a single bit is allocated to each pixel in the dithered signal. Further, since adjacent pixels are binarized in response to different thresholds, the local density of the dithered signal will correspond to the density in the original image. A more complete explanation of half-tone binarization using a dither matrix can be found in U.S. Pat. No. 4,766,499 to Inuzuka.

Group III facsimile machines incorporate modified Huffman encoders as recommended by CCITT T.4. Modified Huffman encoding is a one-dimensional coding method in which code words corresponding to black/white run-lengths are generated. The modified Huffman encoding technique used by Group III facsimiles, however, is optimized to the first through eighth characters of the CCITT test chart. Consequently, this technique does not yield an adequate compression when encoding nonstandard images that do not contain characters of the CCITT test chart. Moreover, half-tone images that have been binarized using dither matrices also have a considerably low compression rate when using the modified Huffman encoding method. In some cases, the coded data from half-tone images can even exceed the data in the original image. For example, in a half-tone image on A-4 paper, using a transmission speed of 9600 bits per second (bps), approximately ten minutes are required to transmit the image. Therefore, this conventional technique is inadequate for the transmission of half-tone and nonstandard images.

SUMMARY OF THE INVENTION

Accordingly, it is object of the present invention to provide a coding method that provides high compression for nonstandard and half-tone images.

It is another object of the present invention to provide an improved coding method.

It is still another object of the present invention to provide a one-dimensional coding method capable of highly compressing half-tone images.

It is a further object of the present invention to provide an arithmetic coding method that shortens a data transmission time.

It is another object of the present invention to provide an arithmetic coding method that reduces data storage space of an encoder.

In an image processing system including a model for generating context numbers in response to masking on current pixels with a local template, adapters for storing stored context information corresponding to the context numbers, and an encoder for encoding the current pixels in response to the storm context information, an arithmetic coding method comprising: initializing the encoder; generating dithered signals by thresholding pixels of image data in response to a dither matrix; identifying reference pixels in the dithered signals corresponding to the current pixels, the reference pixels being an adjacent pixel and a pixel preceding the current pixel by a horizontal size of the dithering matrix; generating a selected context number in response to the reference pixels and a remainder obtained by dividing a horizontal position of the current pixels by the horizontal size of the dithering matrix; encoding a more probable symbol if the more probable symbol of the stored context information corresponding to the selected context number is equal to the current pixels, and encoding a less probable symbol if the more probable symbol of the context information corresponding to the context number is not equal to the current pixel; updating a probability estimation of the context information; checking for completion of encoding a current line; and checking for completion of encoding for a current page after completion of the current line.

BRIEF DESCRIPTION OF THE DRAWINGS

In more complete appreciation of this invention, and many of the attendant advantages thereof, will be readily apparent as the same becomes better understood by reference to be following detailed description when considered in conjunction with the accompanying drawings in which like symbols indicate the same or similar components, wherein:

FIG. 4 is a context table stored for adapter 23 of FIG. 2;

FIG. 5 is an illustration of repeated thresholds in an arbitrary line of pixels;

FIG. 6 is an illustration of an image having a size of 2×12 pixels expressed as half-tones by a 4×4 dither matrix;

FIG. 7 is a context table used for coding the image of FIG. 6; and

DETAILED DESCRIPTION OF THE PREFERRED EMBODIMENT

Figure 1:
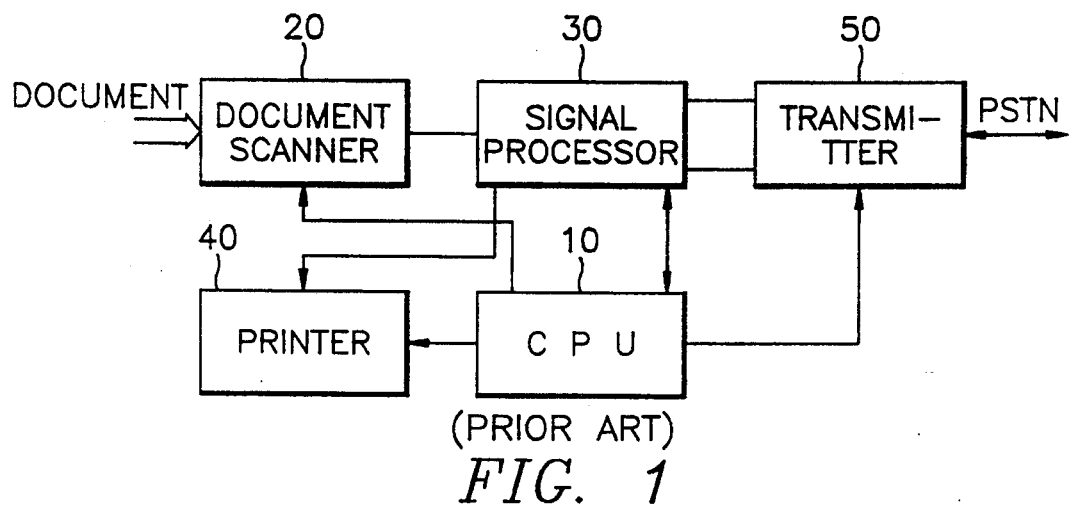
FIG. 1 is a block diagram of a Conventional facsimile machine.

Turning now to FIG. 1, a block diagram of a Conventional facsimile machine is illustrated. The facsimile has a Central Processing Unit 10 for controlling the operation of the facsimile and its several units according to a predetermined program. A document scanner 20 scans a document to generate a digital image data in which each pixel is represented by a plurality of bits. The Central processing unit, in conjunction with a signal processing portion 30, stores and then compares the digital image data from the document scanner 20 to a dither matrix. On the basis of comparisons between the thresholds of the dither matrix and the digital image signal, a dithered signal is generated in which each pixel is represented by a single bit. The dithered signal is then encoded and compressed for transmission. A transmitter 50 modulates the encoded signals from the signal processing portion for transmission across a public switched telephone network (PSTN) to another system.

The transmitter 50 also receives and demodulates transmissions from other system received via the PSTN. The demodulated transmissions are provided to central processing unit 10 and signal processing portion 30 where the demodulated transmissions are decoded. A printer 40 then prints the decoded transmissions.

Figure 2:
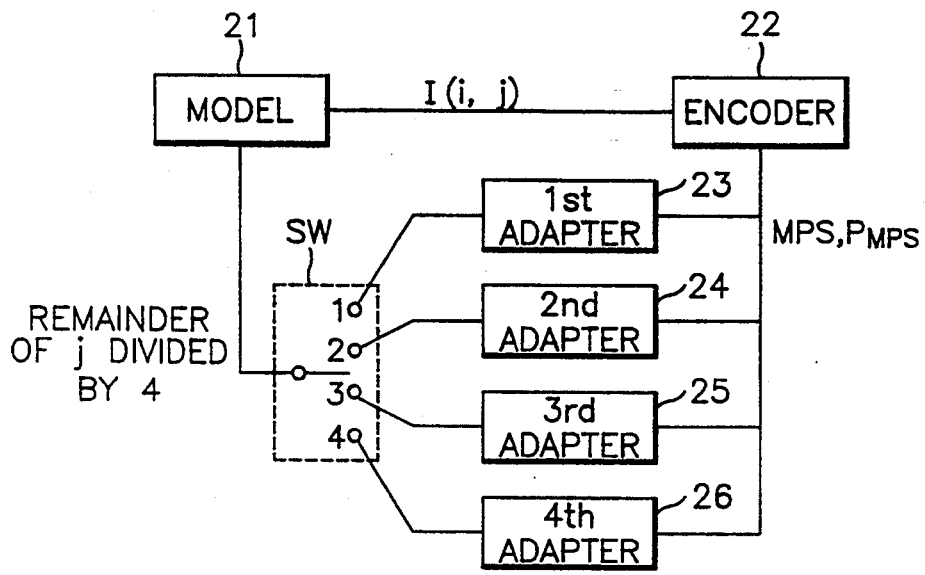
FIG. 2 in a block diagram of a one-dimensional arithmetic encoding device of the present invention.

Turning now to FIG. 2, a one-dimensional arithmetic coding device constructed according to the principles of the present invention is illustrated. The one-dimensional arithmetic coding device of FIG. 2 would be realized as a portion of the CPU 10 in FIG. 1, i.e. the model 21 is symbolic of a number of functions performed by the CPU 10 of FIG. 1. The one-dimensional arithmetic coding device includes a model 21 that receives an image signal X(i,j) from the document scanner 20. Each pixel of the image signal X(i,j) is then binarized in the model in dependence upon a four-by-four dither matrix to generate a dithered signal I(i,j). More specifically, if the four-by-four dither matrix had thresholds of A, B, C, and D on a single horizontal row, each of a first fifteen pixels of the image signal's horizontal row would be recursively thresholded in response to the thresholds A, B, C and D as shown in FIG. 5. The result of this thresholding of the image signal X(i,j) yields the dithered signal I(i,j). Here, i and j represent the horizontal and vertical coordinate position of a pixel.

After generating the dithered signal I(i,j), the model 21 generates a context number for each pixel on the basis the pixel's horizontal position divided by four and the pixel's reference pixels. Specifically, for each pixel, the references pixels are an immediately preceding pixel and a pixel preceding the pixel by four pixels in the dithered signal. That is, for a pixel (i,j), the model 21 generates a context number in response to the remainder of i divided by 4, the dithered signal pixel value I(i−1,j), and the dithered signal pixel value I(i−4,j).

Sixteen possible context numbers exist if a four-by-four dither matrix is used since there are four possible remainders of a pixel's horizontal position divided by four and four possible combinations of the two reference pixel values. FIG. 7 illustrates the conditions under which each of the different context numbers would be generated. For example, if the horizontal position i were 9, and the dithered signal pixels values I(9−4, j) and I(9−1,j) were 1 and 0, respectively, context number 6 would be selected. That is, since the remainder of the horizontal position divided by four is 1, the possible context numbers from FIG. 7 are 4, 5, 6, and 7. Only context number 6, however, corresponds to pixels (5,j) and (8,j) being 1 and 0, respectively.

Figure 3:
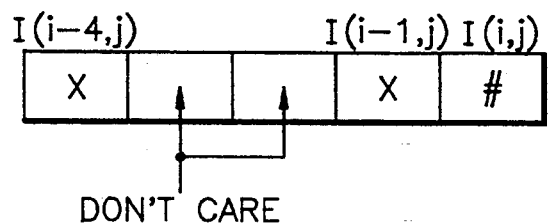
FIG. 3 is an illustration of a local template of applied by the device of FIG. 2.

FIG. 3 illustrates the local template applied by the model 21 to isolate the reference pixels in the dithered signal. As shown in FIG. 3, for each pixel there are two reference pixels, a first reference pixel immediately preceding the current pixel and a second reference pixel preceding the current pixel by four pixels.

The model 21 additionally controls the switch SW to selectively connect to the model 21 to one of a first adapter 23, a second adapter 24, a third adapter 25, and a fourth adapter 26 on the basis of the remainder of the horizontal position i of the current pixel divided by four. As a result, the model 21 provides the context number of a current pixel to only one of the four adapters on the basis of the position of the switch SW.

Each of the four adapter 23 through 26 comprises a memory. The memory of each adapter stores a more probable symbol MPS and a probability of a less probable symbol $P_{LPS}$ for each context number to which that adapter is responsive, probability of the more probable symbol $P_{MPS}=1-P_{LPS}$. For example, the third adapter 25 is switched to receive the context numbers 8, 9, 10, and 11 since these context numbers and this adapter correspond to pixels in which the horizontal position divided by four is two. Consequently, the third adapter 25 stores a more probable symbol MPS and a probability of the less probable symbol $P_{LPS}$ for each of the context number 8, 9, 10, and 11. In other words, the memory of each adapter comprises four groups of two storage positions. Each of the four groups is addressed by a different context number whereas the two storage positions of each group contain a more probable symbol MPS and a probability of the less probable symbol $P_{LPS}$. A single bit is necessary to store a more probable symbol MPS of the context number; several bits are necessary for the probability of the less probable symbol $P_{LPS}$ of the context number.

Based upon the address determined by the context number and the adapter selected by switch SW, the more probable symbol MPS and the probability of the less probable symbol $P_{LPS}$ indicated by the context number are provided to the encoder 22. That is, the model 21, on the basis of the reference pixels, generates a context number which is selectively provided to one of the four adapters 23–26. This selected adapter is addressed by the received context number and provides the corresponding more probable symbol and the probability of the less probable symbol to the encoder 22.

The encoder 22 receives the dithered signal I(i,j) from the model 21 and the more probable symbol MPS and the probability of the less probable symbol $P_{LPS}$ and encodes the dithered signal by sending either the more probable symbol or the less probable symbol on a basis of a comparison between the dithered signal and the provided more probable symbol. Also, on the basis of the comparison between the dither signal I(i,j) and the more probable symbol provided by the selected adapter, the encoder updates the more probable symbol and the probability of the less probable symbol of that selected adapter. In this way, the encoder 22 adaptively updates its method of encryption by modifying the stored more probable symbol and the probability of the less probable symbol in response to the current encoding.

The probability transition table used for estimating and updating the probability of the less probable symbol stored in each adapter and the algorithm for encoding the more probable symbol MPS and the less probable symbol LPS are applied in the same way as the Q coder suggested by I.B.M. Co. in the *Joint Photograph Export Group* (JPEG) draft chapter 5.12, Dec. 15, 1989, attached hereto, the disclosure of which is incorporated hereinto by reference thereto. It is further suggested that in the implementation of this Q coder, since the encoded data of two continuous bytes will not fall in the range of FF80H through to FFFFH, values within this range should be used as control signals. Specifically, for example, an end of line EOL could be identified as FFFEH and an end of page EOP could be identified as FFFFH.

Figure 8:
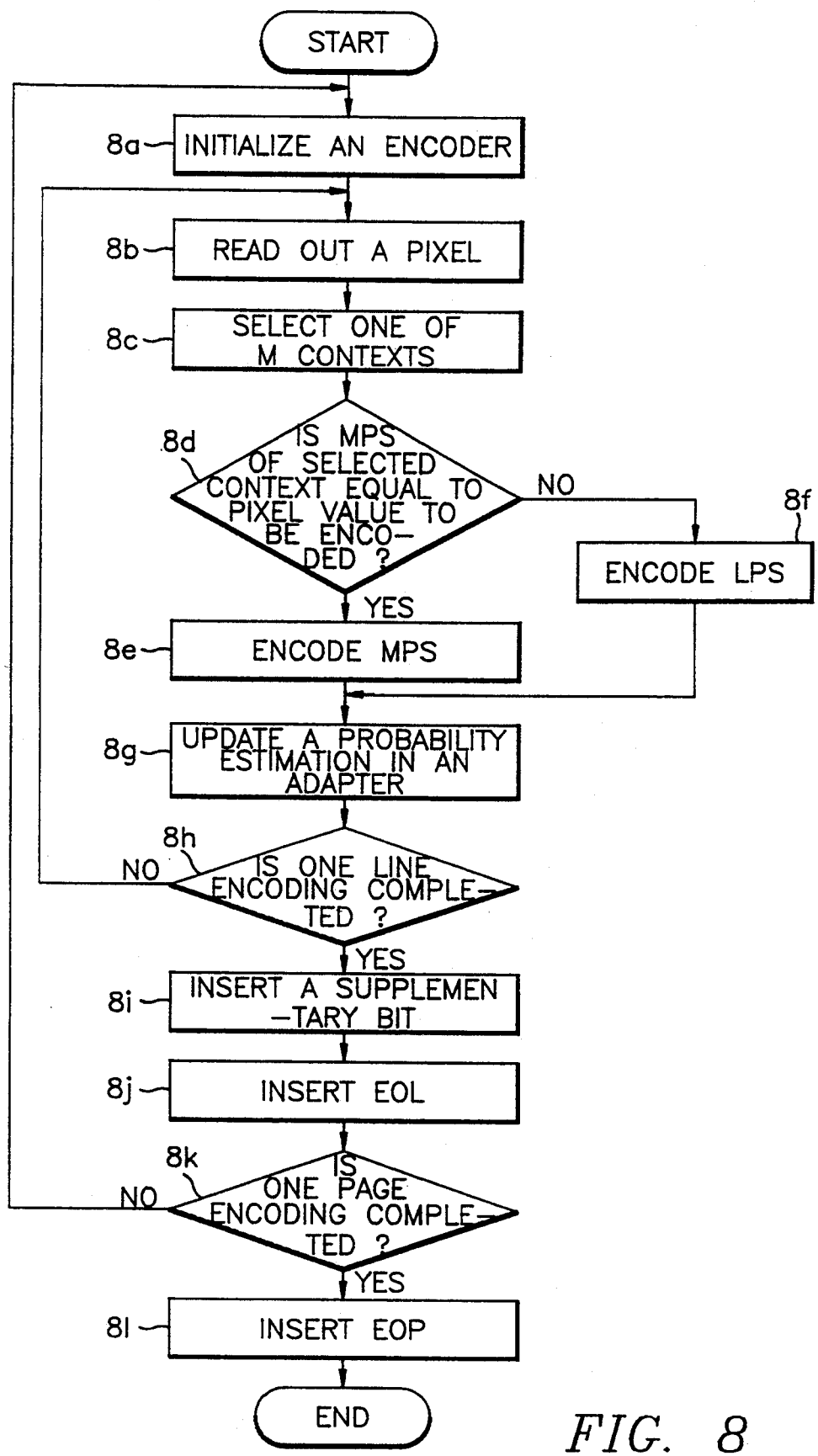
FIG. 8 is a flowchart of arithmetic coding operations of the invention.

FIG. 8 is a flowchart of an arithmetic coding operation conceived according to the principles of the present invention. The following paragraphs specifically describe the flowchart by way of example. FIG. 6 is an illustration of an exemplary portion of an image of two-by-twelve pixels and the dithered signal pixel values for each of the pixels to aid in the example. The dithered signal expressed in FIG. 6 was generated in response to a four-by-four dither matrix. For the convenience of the description, references (1) to (24) in FIG. 6 are numerals for identifying the corresponding pixels. FIG. 7 is the context table used in the following example.

In accordance with block 8a of the flowchart of FIG. 8, the encoder 22 is initialized when an encoding operation is started or after one line of encoding is completed. Then, a more probable symbol MPS and the probability of the less probable symbol $P_{LPS}$ for each context number in each adapter 23 through 26 is initialized to "0" and 0.503937, respectively.

After the initialization, a CPU 10 receives an image signal of a document from a scanner 20 and applies the local template for the current pixel in block 8b. As a result, the reference pixels for the current pixel are isolated as shown in FIG. 3.

At block 8c, the CPU 10 determines the context number which corresponds to the horizontal position of the current pixel and the isolated reference pixels of the current pixel.

If, in decision block 8d, the current pixel value of the dithered signal were determined to be equal to the more probable symbol, then the encoder 22 encodes the more probable symbol MPS by making use of the probability of the less probable symbol $P_{LPS}$, in block 8e. If, in decision block 8d, the current pixel value of the dithered signal were determined to be not equal to the that the more probable symbol MPS, then the encoder 22 encodes a less probable symbol at block 8f.

Accordingly, detailed description of encoding operations for the successive pixels (1) to (24) of FIG. 6 is as follows.

Encoding pixel (1): Dithered signal $I(i-1,j)=0$, $I(i-4,j)=0$, Remainder (i/4)=0. Consequently, the model 21 provides a context number 0 to the first adapter 23. For the context number 0, the more probable symbol MPS=0 and the probability of the less probable symbol $P_{LPS}=0.503937$, the initialized values. Since current pixel value for the dithered signal is "0," the more probable symbol matches the current pixel value. Therefore, the more probable symbol is encoded by the encoder 22 of FIG. 2. In step 8g, the encoder 22 then updates the more probable symbol MPS and the probability of the less probable symbol $P_{LPS}$ of context number 0 to "0" and 0.492218, respectively, in the first adapter 23.

Encoding pixel (2): Dithered signal $I(0,j)=0$, $I(i-4,j)=0$, Remainder (i/4)=1. Consequently, the model 21 provides a context number 4 to the second adapter 24. For the context number 4, the more probable symbol MPS=0 and the probability of the less probable symbol $P_{LPS}=0.503937$, the initialized values. Since current pixel value for the dithered signal is "1," the more probable symbol does not match the current pixel value. Therefore, the less probable symbol is encoded by the encoder 22 of FIG. 2. The encoder 22 then updates the more probable symbol MPS and the probability of the less probable symbol $P_{LPS}$ of context number 4 to "1" and 0.503937, respectively, in the second adapter 24.

Encoding pixel (3): Dithered signal $I(1,j)=1$, $I(i-4,j)=0$, Remainder (i/4)=2. Consequently, the model 21 provides a context number 9 to the third adapter 25. For the context number 9, the more probable symbol MPS=0 and the probability of the less probable symbol $P_{LPS}=0.503937$, the initialized values. Since current pixel value for the dithered signal is "1," the more probable symbol does not match the current pixel value. Therefore, the less probable symbol is encoded by the encoder 22 of FIG. 2. The encoder 22 then updates the more probable symbol MPS and the probability of the less probable symbol $P_{LPS}$ of context number 9 to "1" and 0.503937, respectively, in the third adapter 25.

Encoding pixel (4): Dithered signal $I(2,j)=1$, $I(i-4,j)=0$, Remainder (i/4)=3. Consequently, the model 21 provides a context number 13 to the fourth adapter 26. For the context number 13, the more probable symbol MPS=0 and the probability of the less probable symbol $P_{LPS}=0.503937$, the initialized values. Since current pixel value of dithered signal is "0," the more probable symbol matches the current pixel value. Therefore, the more probable symbol is encoded by the encoder 22 of FIG. 2. The encoder 22 then updates the more probable symbol MPS and the probability of the less probable symbol $P_{LPS}$ of context number 13 to "0" and 0.492218, respectively, in the fourth adapter 26.

Encoding pixel (5): Dithered signal $I(3,j)=0$, $I(0,j)=0$, Remainder (i/4)=0. Consequently, the model 21 provides a context number 0 to the first adapter 23. For the context number 0, the more probable symbol MPS=0 and the probability of the less probable symbol $P_{LPS}=0.492218$. Since current pixel value for the dithered signal is "0," the more probable symbol matches the current pixel value. Therefore, the more probable symbol is encoded by the encoder 22 of FIG. 2. The encoder 22 then updates the more probable symbol MPS and the probability of the less probable symbol $P_{LPS}$ of context number 0 to "0" and 0.474640, respectively, in the first adapter 23.

Encoding pixel (6): Dithered signal $I(4,j)=0$, $I(1,j)=1$, Remainder (i/4)=1. Consequently, the model 21 provides a context number 6 to the second adapter 24. For the context number 6, the more probable symbol MPS=0 and the probability of the less probable symbol $P_{LPS}=0.503937$, the initialized values. Since current pixel value for the dithered signal is "1," the more probable symbol does not match the current pixel value. Therefore, the less probable symbol is encoded by the encoder 22 of FIG. 2. The encoder 22 then updates the more probable symbol MPS and the probability of the less probable symbol $P_{LPS}$ of context number 6 to "1" and 0.503937, respectively, in the second adapter 24.

Encoding pixel (7): Dithered signal $I(5,j)=1$, $I(2,j)=1$, Remainder (i/4)=2. Consequently, the model 21 provides a context number 11 to the third adapter 25. For the context number 11, the more probable symbol MPS=0 and the probability of the less probable symbol $P_{LPS}=0.503937$, the initialized values. Since current pixel value for the dithered signal is "0," the more probable symbol matches the current pixel value. Therefore, the more probable symbol is encoded by the encoder 22 of FIG. 2. The encoder 22 then updates the more probable symbol MPS and the probability of the less probable symbol $P_{LPS}$ of context number 11 to "0" and 0.492218, respectively, in the third adapter 25.

Encoding pixel (8): Dithered signal $I(6,j)=0$, $I(3,j)=0$, Remainder (i/4)=3. Consequently, the model 21 provides a context number 12 to the fourth second adapter 26. For the context number 12, the more probable symbol MPS=0 and the probability of the less probable symbol $P_{LPS}$=0.503937, the initialized values. Since current pixel value for the dithered signal is "1," the more probable symbol does not match the current pixel value. Therefore, the less probable symbol is encoded by the encoder 22 of FIG. 2. The encoder 22 then updates the more probable symbol MPS and the probability of the less probable symbol $P_{LPS}$ of context number 4 to "1" and 0.503937, respectively, in the fourth adapter 26.

Encoding pixel (9): Dithered signal I(7,j)=1, I(4,j)=0, Remainder (i/4)=0. Consequently, the model 21 provides a context number 1 to the first adapter 23. For the context number 1, the more probable symbol MPS=0 and the probability of the less probable symbol $P_{LPS}$=0.503937, the initialized values. Since current pixel value for the dithered signal is 37 0," the more probable symbol matches the current pixel value. Therefore, the more probable symbol is encoded by the encoder 22 of FIG. 2. The encoder 22 then updates the more probable symbol MPS and the probability of the less probable symbol $P_{LPS}$ of context number 1 to "0" and 0.492218, respectively, in the first adapter 23.

Encoding pixel (10): Dithered signal I(8,j)=0, I(5,j)=1, Remainder (i/4)=1. Consequently, the model 21 provides a context number 6 to the second adapter 26. For the context number 6, the more probable symbol MPS=1 and the probability of the less probable symbol $P_{LPS}$=0.503937. Since current pixel value for the dithered signal is "0," the more probable symbol does not match the current pixel value. Therefore, the less probable symbol is encoded by the encoder 22 of FIG. 2. The encoder 22 then updates the more probable symbol MPS and the probability of the less probable symbol $P_{LPS}$ of context number 6 to "0" and 0.503937, respectively, in the second adapter 24.

Encoding pixel (11): Dithered signal I(9,j)=0, I(6,j)=0, Remainder (i/4)=2. Consequently, the model 21 provides a context number 8 to the third adapter 25. For the context number 8, the more probable symbol MPS=0 and the probability of the less probable symbol $P_{LPS}$=0.503937, the initialized values. Since current pixel value for the dithered signal is "0," the more probable symbol matches the current pixel value. Therefore, the more probable symbol is encoded by the encoder 22 of FIG. 2. The encoder 22 then updates the more probable symbol MPS and the probability of the less probable symbol $P_{LPS}$ of context number 8 to "0" and 0.492218, respectively, in the third adapter 25.

Encoding pixel (12): Dithered signal I(10,j)=0, I(7,j)=1, Remainder (i/4)=3. Consequently, the model 21 provides a context number 14 to the fourth adapter 26. For the context number 14, the more probable symbol MPS=0 and the probability of the less probable symbol $P_{LPS}$=0.503937, the initialized values. Since current pixel value for the dithered signal is "1," the more probable symbol does not match the current pixel value. Therefore, the less probable symbol is encoded by the encoder 22 of FIG. 2. The encoder 22 then updates the more probable symbol MPS and the probability of the less probable symbol $P_{LPS}$ of context number 4 to "1" and 0.503937, respectively, in the adapter 26.

At decision block 8h, the CPU 10 determines whether all the pixels in the first line have been encoded. If first line encoding has not been completed, program flow then s continues back to block 8b at which time the next pixel is read out.

A supplementary bit (FILL) is inserted to maintain a minimum line scanning time after first line encoding has been completed as seen at block 8i. At block 8j, an end-of-line control signal (EOL) is inserted after the supplementary bit has been inserted.

At decision block 8k, the CPU 10 checks the completion of encoding for one page, and controls to initialize the encoder 22 if the one-page encoding is not completed. That is, after encoding for 1st line in FIG. 6 is completed as described above, the MPS and the $P_{LPS}$ of each of 16 contexts are initialized, encoding for (13) to (24) in 2nd line is performed by the same way.

An end-of-page control signal (EOP) is inserted after one-page encoding is completed as seen at block 8l.

Although in this particular embodiment of the present invention as described above refers to a four-by-four dither matrix, invention may also be practiced using M×M dither matrix with appropriate changes to the number of adapters and context table. In the half-tones image obtained by using M×M dither matrix, a correlation of neighboring pixels having M pixel interval and binarized by the same threshold value is higher than that of neighboring pixels having 1 pixel interval. Even if a decoding party is not illustrated and described, it may also be changed according to the change of the encoding party.

In summary, the foregoing describes method for converting prior arithmetic coding method that applies to a Group III facsimile. There is an advantage of reducing the amount of computation and the size of memory with a high data compression rate by s adapting a one-dimensional arithmetic coding method. Also, there are advantages of reducing an image transmission time, and also preventing transmission errors from affecting subsequent lines.

While only certain preferred features of the invention have been shown by way of illustration, many modifications and changes will be apparent to those skilled in the art. It is, therefore, to be understood that the present claims are intended to cover all such modifications and changes which fall within the true spirit of the invention.

What is claimed is:

1. In an image processing system including means for generating context numbers indicative of relative positions of current pixels and binary states of pixels preceding said current pixels, means for storing context information corresponding to said context numbers, and an encoder for encoding said current pixels in response to said context information, an arithmetic coding method comprising the steps of:

initializing said encoder;

generating dithered signals corresponding to said current pixels by comparing values of said current pixels to threshold values of a dither matrix;

identifying reference pixels corresponding to a first of said current pixels, said reference pixels being a first pixel adjacent to said first current pixel and a second pixel preceding said first current pixel by a number of pixels equal to a horizontal size of said dither matrix;

generating a selected context number for said first current pixel based upon values of said reference pixels and a remainder quantity, said remainder quantity being a fractional portion left over after dividing a value indicative of a horizontal position of said first current pixel by a value indicative of said horizontal size of said dither matrix;

encoding a more probable symbol corresponding to said selected context number if said more probable symbol is equal to the dithered signal corresponding to said first current pixel, said more probable symbol indicating a binary state corresponding to said selected context number that is most likely to occur, and encoding a less probable symbol corresponding to said selected context number if said more probable symbol is not equal to the dithered signal corresponding to said first current pixel, said less probable symbol being the binary state opposite said more probable symbol;

updating a probability estimation corresponding to said selected context number, said probability estimation producing a new more probable symbol and a probability that said less probable symbol will occur;

determining whether a current line has been completely encoded; and determining whether a current page has been completely encoded after it is determined that said current line has been completely encoded.

2. The arithmetic coding method according to claim 1, further comprising a step of inserting a supplementary bit after said current line has been completely encoded to maintain a minimum line scanning time.

3. The arithmetic coding method of claim 2, further comprising a step of inserting an end-of-line control signal after said supplementary bit is inserted.

4. The arithmetic coding method according to claim 3, further comprising a step of inserting an end-of-page control signal after encoding said current page.

5. The arithmetic coding method of claim 1, further comprising steps of:

inserting an end-of-line control signal after a supplementary bit is inserted; and inserting an end-of-page control signal after encoding a page.

6. In a facsimile device including means for generating a context number representative of a relative position of a current pixel and binary states of pixels preceding said current pixel, means for changing said context information, and an encoder for encoding said current pixel, an arithmetic coding method comprising the steps of:

initializing said encoder;

generating a dithered signal corresponding to said current pixel by comparing a value of said current pixel to a threshold value contained within a dither matrix;

identifying reference pixels corresponding to said current pixel, said reference pixels being a pixel adjacent to said current pixel and a pixel preceding said current pixel by a number of pixels equal to a horizontal size of said dither matrix;

selecting said context number based upon said reference pixels and a remainder quantity, said remainder quantity being a fractional portion remaining after dividing a value indicative of a horizontal position of said current pixel by a value indicative of said horizontal size of said dither matrix;

encoding a more probable symbol corresponding to said context number if said more probable symbol is equal to said dithered signal corresponding to said current pixel, said more probable symbol representing a binary state corresponding to said context number that is most likely to occur, and encoding a less probable symbol if said more probable symbol is not equal to said dithered signal corresponding to said current pixel, said less probable symbol being the binary state opposite said more probable symbol;

updating a probability estimation corresponding to said context number, said probability estimation producing a new more probable symbol and a probability that said less probable symbol will occur; and determining whether a current line has been completely encoded.

7. The arithmetic coding method according to claim 6, further comprising a step of inserting a supplementary bit after said current line has been completely encoded to maintain a minimum line scanning time.

8. The arithmetic coding method of claim 8, further comprising a step of inserting an end-of-line control signal after said supplementary bit is inserted.

9. An arithmetic coding method, comprising the steps of:

generating a dithered signal corresponding to a current pixel by comparing a value of said current pixel to a threshold value from a dither matrix;

generating a context number corresponding to said current pixel, said context number being based upon values of reference pixels and a remainder quantity, said remainder quantity being a fractional portion remaining after dividing a value indicative of a horizontal position of said current pixel by a value indicative of a horizontal width of said dither matrix;

generating a more probable symbol corresponding to said context number, said more probable symbol indicating a binary state corresponding to said context number that is most likely to occur;

encoding said more probable symbol corresponding to said context number when said more probable symbol matches said dithered signal corresponding to said current pixel, and encoding a less probable symbol when said more probable symbol does not match said dithered signal corresponding to said current pixel, said less probable symbol being the binary state opposite said more probable symbol; and updating a probability estimation for said context number, said probability estimation yielding a new more probable symbol and a probability that said less probable symbol will occur.

10. The method as claimed in claim 9, wherein said step of generating said context number further comprises:

addressing context information corresponding to said context number, said context information being stored in an adapter, said context information comprising said more probable symbol and said probability that said less probable symbol will occur.

11. The method as claimed in claim 9, wherein said reference pixels are a first pixel immediately preceding said current pixel and a second pixel preceding said current pixel by a number of pixels equal to said horizontal width of said dither matrix.

12. An arithmetic coding method, comprising the steps of:

initializing an encoder;

generating a dithered signal corresponding to a current pixel by comparing a value of said current pixel to a threshold value from a dither matrix;

generating a context number for said current pixel, said context number generated in dependence upon values of reference pixels corresponding to said current pixel and a remainder quantity, said remainder quantity being a fractional portion left over after dividing a value indicative of a horizontal position of said current pixel by a value indicative of a horizontal width of said dither matrix;

addressing context information corresponding to said context number, said context information comprising a more probable symbol and a probability that a less probable symbol will occur, said more probable symbol indicating a binary state corresponding to said context number, said less probable symbol being the binary state opposite said more probable symbol;

encoding said more probable symbol corresponding to said context number when said more probable symbol is equal to said dithered signal corresponding to said current pixel and encoding said less probable symbol corresponding to said context number when said more probable symbol is not equal to said dithered signal corresponding to said current pixel; and updating said context information corresponding to said context number.

13. The method as claimed in claim 12, wherein said reference pixels corresponding to said current pixel are a first pixel immediately preceding said current pixel, and a second pixel preceding said current pixel by a number of pixels equal to said horizontal width of said dither matrix.

14. An arithmetic coding method, comprising the steps of:

selecting a current pixel;

generating a dithered signal corresponding to said current pixel by comparing a value of said current pixel to a threshold value from a dither matrix;

determining reference pixels corresponding to said current pixel in dependence upon pixels positioned on a first side of said current pixel;

determining a remainder quantity indicative of a fractional portion remaining after dividing a value indicative of a horizontal position of said current pixel by a value indicative of a horizontal width of said dither matrix;

selecting a context number corresponding to said current pixel in dependence upon said reference pixels and said remainder quantity;

selecting context information corresponding to said context number, the selected context information comprising a more probable symbol of said current pixel, said more probable symbol indicating a binary value of said current pixel that is most likely to occur;

encoding said more probable symbol if said more probable symbol matches said dithered signal corresponding to said current pixel, and encoding a less probable symbol if said more probable symbol does not match said dithered signal corresponding to said current pixel, said less probable symbol being a binary state opposite said more probable symbol; and updating said context information corresponding to said context number.

15. The method as claimed in claim 14, wherein said reference pixels corresponding to said current pixel are a first pixel adjacent to said current pixel and a second pixel preceding said current pixel by a number of pixels equal to a horizontal width of said dither matrix.

16. An arithmetic coding device, comprising:

means for generating a dithered signal corresponding to a current pixel by comparing a value of said current pixel to a threshold value from a dither matrix;

means for generating reference pixels corresponding to said current pixel by examining values of pixels preceding said current pixel;

means for generating a remainder quantity corresponding to said current pixel, said remainder quantity being a fractional amount left over after dividing a value indicative of a horizontal position of said current pixel by a value indicative of a horizontal dimension of said dither matrix;

means for generating a context number of said current pixel in dependence upon said reference pixels and said remainder quantity;

means for providing context information corresponding to said context number of said current pixel, said context information comprising a more probable symbol and a probability of a less probable symbol, said more probable symbol indicating a binary state corresponding to said context number that is most likely to occur, said less probable symbol being the binary state opposite said more probable symbol; and means for comparing said dithered signal corresponding to said current pixel to said more probable symbol of said context information, for encoding said more probable symbol when said dithered signal corresponding to said current pixel is equal to said more probable, and for encoding said less probable symbol when said dithered signal corresponding to said current pixel is not equal to said more probable symbol.

17. The device claimed in claim 16, wherein said reference pixels are a first pixel directly adjacent to said current pixel and a second pixel preceding said current pixel by a number of pixels equal to said horizontal dimension of said dither matrix.

18. An apparatus for performing arithmetic encoding comprising:

means for selecting a current pixel;

means for generating a dithered signal corresponding to said current pixel by comparing a value of said current pixel with a threshold value of a dither matrix;

means for selecting reference pixels corresponding to said current pixel;

means for computing a remainder quantity corresponding to said current pixel, said remainder quantity being an amount left over after dividing a value representative of a horizontal position of said current pixel by a value representative of a horizontal dimension of said dither matrix;

means for selecting a context number corresponding to said current pixel, said context number based solely upon values of said reference pixels and said remainder quantity, said context number having a more probable state and a less probable state, said more probable state being a binary state corresponding to said context number that is most likely to occur, said less probable state being the binary state opposite said more probable state; and means for encoding said current pixel as said more probable state if said more probable state is equal to a value of said dithered signal corresponding to said current pixel, and for encoding said current pixel as said less probable state if said more probable state is not equal to said value of said dithered signal.

19. The apparatus claimed in claim 18, further comprising said reference pixels comprised of a first pixel directly adjacent to said current pixel and a second pixel preceding said current pixel by a number of pixels equal to said horizontal dimension of said dither matrix.

20. The apparatus claimed in claim 18, further comprising:

means for updating a probability estimation corresponding to said context number, said probability estimation producing a new more probable state and a probability that said less probable state will occur; and means for determining whether a current line has been completely encoded.

* * * * *